Patented Sept. 14, 1948

2,449,527

UNITED STATES PATENT OFFICE 2,449,527

POLYMERS OF MONOVINYLPHENOXTHINES AND METHOD OF PREPARING THE SAME

Ralph G. Flowers and Leola W. Flowers, Pittsfield, Mass., assignors to General Electric Company, a corporation of New York No Drawing. Application May 29, 1947, Serial No. 751,469

7 Claims. (Cl. 260—85)

The present invention relates broadly to polymers of vinyl compounds and their preparation. More specifically, the invention is directed to the production of polymers of vinyl-substituted phenoxthines, e. g., poly-3-vinylphenoxthine.

In our copending application Serial No. 751,468 filed concurrently herewith and assigned to the assignee of the present invention, monovinylphenoxthines and the method of preparing these compounds is disclosed and claimed. We have discovered that masses comprising these monomeric materials may be polymerized, and the present invention is specifically directed to the polymerization of the monomeric materials described and claimed in the aforesaid application.

As described in the above-mentioned application, monovinylphenoxthines are prepared by acetylating phenoxthine with an acetylating agent, e. g., acetic acid or anhydride, acetyl chloride or bromide, ketene, etc., to obtain a monoacetylphenoxthine, e. g., 3-acetylphenoxthine. Diacetylphenoxthines may be prepared by further acetylation of monoacetylphenoxthines and polymerizable divinylphenoxthines may be obtained from the diacetylphenoxthines by employing the same method as that used for preparing the monovinylphenoxthines from monoacetylphenoxthines. Depending on the position of the vinyl group desired in the monovinylphenoxthine, an acetylated phenoxthine having the acetyl group in the position corresponding to that vinyl group of the desired vinyl compound is hydrogenated to form an $\alpha$-hydroxyethylphenoxthine. The $\alpha$-hydroxyethylphenoxthine is the dehydrated in contact with a dehydration catalyst to obtain the monovinylphenoxthine. The monovinylphenoxthines are solid crystalline materials of relatively low melting point. 3-vinylphenoxthine, for example, has a melting point of 39.5–41° C.

The polymerization of monovinylphenoxthines may be accomplished by polymerizing masses comprising the monomers themselves, a solution thereof, or the polymerization may be carried out in an emulsion or suspension of the monomer. The readiness and speed of the polymerization depend greatly upon the purity of the monomer. The purer the monomer, the greater is the ease and rate of polymerization, and the higher the molecular weight of the polymer. The physical properties of the polymers are to a large extent dependent upon the method of polymerization. For example, polymerizations carried out at high temperatures or at a very rapid rate usually produce a product that is discolored and of low molecular weight. In order to produce valuable polymerization products careful control of the polymerization is necessary.

The polymerization may be carried out by means or heat alone or it may be accelerated by the use of catalysts such as, for example, $BF_3$, $BF_3$ etherate, $SnCl_4$, $SbCl_5$, organic or inorganic peroxides, air, the halogens, oxygen, ozone and the halogen acids, all of the foregoing being examples of vinyl polymerization catalysts, light of short wave length, and substances such as activated carbon or copper which possess large surface area. Small amounts of solvents have little effect upon the rate of polymerization. Larger amounts tend to favor the formation of short chain lengths and often cause an interval to elapse between the addition of the catalyst and the beginning of polymerization. The monomers may, in general, be inhibited by the same inhibiting agents that retard the polymerization of styrene, e. g., catechol, hydroquinone, etc.

The above described methods of polymerization are applicable to any of the specific monomeric monovinylphenoxthines, e. g., 3-vinylphenoxthine prepared as described in our application Serial No. 751,468 and referred to earlier in this specification.

The polymers of our invention possess in general the physical properties of polystyrene except that the softening points of these polymers are considerably higher than the softening point of polystyrene. The electrical properties of these polymers are likewise comparable to those of polystyrene, making them valuable for use in electrical insulation. The electrical properties of the polymers of this invention will hereinafter be set forth more specifically.

The polymers of this invention can, in general, be treated in the same manner as any other thermoplastic material. They may be cast, pressed, extruded, rolled, machined, and injection or pressure molded. The monomeric monovinylphenoxthines are especially valuable as solventless varnishes or impregnating mediums. Because of their high boiling points, processes involving the use of vacuum can be employed without undue loss by vaporization.

The polymers are, in general, compatible with the same materials as polystyrene. For example, they can be plasticized by the same plasticizers. Softening agents or plasticizers may be added where softening point and strength are of secondary importance. Materials simulating synthetic resin may be prepared from these polymers by adding relatively large amounts of plasticizers.

Furthermore, useful molding powders may be prepared by mixing the polymers with suitable fillers, such as, for example, alpha-cellulose, mica dust, oxides of titanium, talc, zinc oxide, magnesium oxide, asbestos, quartz, wood flour, cellulose or wool fibers, etc.

The following examples will further illustrate the preparation and properties of the polymers of this invention but the invention is not restricted by these examples. All parts are by weight.

*Example 1*

One part of 3-vinylphenoxthine was dissolved in 5 parts of benzene and 0.05 part of boron trifluoride etherate solution was added. Polymerization of the 3-vinylphenoxthine was completed within a few minutes, with the evolution of heat. The polymer was precipitated as a white powder from the benzene solution by the addition of methyl alcohol. This white powder, when filtered and washed with more alcohol, was found to be thermoplastic and could be molded into a mass which was pliable at temperatures above 200° C.

*Example 2*

One part of 3-vinylphenoxthine was dissolved in 10 parts of benzene and 0.2 part of benzoyl peroxide was added to the solution. Polymerization was then carried out by heating the solution in an oil bath at 100° C. for six hours. The resulting polymer was precipitated as a very fine white powder from the benzene solution by the addition of methyl alcohol.

*Example 3*

Two (2) parts of 3-vinylphenoxthine was dissolved in 4 parts of benzene. 0.2 part of tertiary butyl hydroperoxide was added and the solution was heated for 3½ hours in an oil bath at 100° C. A 90% yield of white polymer was obtained by precipitation when methyl alcohol was added to the benzene solution.

*Example 4*

A disk of polymerized 3-vinylphenoxthine was prepared by polymerizing a small amount of the monomer in an open beaker without catalyst. The polymerization was carried out at a temperature of 130° C. The resulting disk was hard, transparent and brittle at room temperatures, but was very pliable at temperatures above 200° C. The electrical properties of the disk were determined at 25° C. At 60 cycles the polymerized disk had a power factor of 0.108% and a dielectric constant of 3.42. At one megacycle the power factor was 0.148% and the dielectric constant was 3.34.

It will be evident from the foregoing examples of the preparation of polymerized monovinylphenoxthines that the polymers may be prepared from the monomeric materials in a variety of ways, e. g., at various temperatures, with or without catalysts, and with or without solvents. Furthermore, as has heretofore been pointed out, the polymers may be mixed with various solvents, plasticizers, other resins, fillers, etc., depending on the requirements of the particular application.

For example, the polymers may be dissolved in various solvents and applied to paper, glass cloth, and other materials to form sheets which are useful as dielectrics, in capacitors, or they may be used to form self-supporting films.

The polymers of this invention, as noted particularly in the foregoing description and examples, have valuable physical and electrical characteristics, such as high softening point and low power factor, of importance in connection with the use of the polymers as dielectric materials in high frequency electrical apparatus.

What we claim as new and desire to secure by Letters Patent of the United States is:

1. A homopolymer of monovinylphenoxthine.
2. Homopolymeric 3-vinylphenoxthine.
3. The method of preparing a synthetic composition which comprises a monovinylphenoxthine as the sole polymerizable ingredient.
4. The method of preparing a synthetic composition which comprises heating a mass containing 3-vinylphenoxthine as the sole polymerizable ingredient.
5. The method of preparing a synthetic composition which comprises heating monovinylphenoxthine in the presence of a vinyl polymerization catalyst.
6. The method of preparing a synthetic composition which comprises heating 3-vinylphenoxthine in the presence of a vinyl polymerization catalyst.
7. The method of preparing a synthetic composition which comprises heating, in solution, and in the presence of a vinyl polymerization catalyst, a mass containing 3-vinylphenoxthine as the sole polymerizable ingredient.

RALPH G. FLOWERS.
LEOLA W. FLOWERS.